United States Patent
Kim et al.

(10) Patent No.: US 7,860,463 B2
(45) Date of Patent: Dec. 28, 2010

(54) METHOD OF REPORTING CHANNEL STATE IN MOBILE COMMUNICATION SYSTEM

(75) Inventors: Dong-Ho Kim, Seoul (KR); Ho-Jin Kim, Seoul (KR); Dong-Ho Cho, Seoul (KR); Yung-Soo Kim, Seongnam-si (KR); Ju-Yeop Kim, Anyang-si (KR); O-Hyun Jo, Cheongju-si (KR); Ho-Won Lee, Chungju-si (KR); Tae-Soo Kwon, Ansan-si (KR); Sik Choi, Daejeon (KR)

(73) Assignees: Samsung Electronics Co., Ltd (KR); Korea Advanced Institute of Science & Technology (KAIST) (KR)

( * ) Notice: Subject to any disclaimer, the term of this patent is extended or adjusted under 35 U.S.C. 154(b) by 966 days.

(21) Appl. No.: 11/706,627

(22) Filed: Feb. 15, 2007

(65) Prior Publication Data
US 2007/0207742 A1    Sep. 6, 2007

(30) Foreign Application Priority Data
Feb. 15, 2006   (KR) ...................... 10-2006-0014630

(51) Int. Cl.
*H04B 1/00*   (2006.01)
*H04B 7/00*   (2006.01)
*H04W 72/00*  (2009.01)

(52) U.S. Cl. .................. 455/69; 455/67.11; 455/450

(58) Field of Classification Search .................. 455/69, 455/67.11, 67.13, 67.14, 63.1, 135, 226.3, 455/296, 226.1, 226.2, 226.4, 517, 450, 452.1, 455/522; 370/326, 318, 328, 329, 252
See application file for complete search history.

(56) References Cited

U.S. PATENT DOCUMENTS
7,379,492 B2   5/2008   Hwang

FOREIGN PATENT DOCUMENTS
| EP | 0 869 647 | 3/1998 |
| GB | 2 410 152 | 7/2005 |
| KR | 1020030096927 | 12/2003 |
| KR | 1020040043277 | 5/2004 |

OTHER PUBLICATIONS
M. A. Haleem et al., "Adaptive Stochastic Iterative Rate Selection for Wireless Channels", XP-001198350, IEEE Communications Letters, vol. 8, No. 5, May 2004.

*Primary Examiner*—Eugene Yun
(74) *Attorney, Agent, or Firm*—The Farrell Law Firm, LLP

(57) ABSTRACT

A method of reporting channel state information by a Mobile Station (MS) in a mobile communication system is disclosed. The method includes measuring a state of a downlink channel for the entire frequency band, determining a first Modulation and Coding Scheme (MCS) level corresponding to the measured channel state, and reporting the determined MCS level to a Base Station (BS).

8 Claims, 5 Drawing Sheets

METHOD OF REPORTING CHANNEL STATE IN MOBILE COMMUNICATION SYSTEM

PRIORITY

This application claims priority under 35 U.S.C. §119(a) to a Korean Patent Application filed in the Korean Intellectual Property Office on Feb. 15, 2006 and assigned Serial No. 2006-14630, the entire disclosure of which is hereby incorporated by reference.

BACKGROUND OF THE INVENTION

1. Field of the Invention

The present invention generally relates to a mobile communication system, and in particular, to a method of reporting a channel state in a mobile communication system.

2. Description of the Related Art

In a $4^{th}$-Generation (4G) mobile communication system, which is the next generation communication system, research has been actively pursued to provide users with services at a high transmission rate of about 100 Mbps.

Adaptive Modulation and Coding (AMC) is a scheme for high-speed data transmission. The AMC scheme determines different modulation schemes and coding schemes according to channel states between a Base Station (BS) and a Mobile Station (MS), thereby improving overall system efficiency. The AMC scheme having a plurality of modulation schemes and a plurality of coding schemes modulates and codes channel signals using combinations of the modulation schemes and the coding schemes.

Generally, each of the combinations of the modulation schemes and the coding schemes is referred to as a Modulation and Coding Scheme (MCS) and a plurality of MCSs from level 1 to level N can be defined according to the number of the MCSs. In other words, the AMC scheme adaptively determines the MCS level according to the channel states between the MS and the BS, thereby improving overall system efficiency.

In a mobile communication system using the AMC scheme, an MS periodically measures the channel state of a downlink and transmits information about the measured channel state, i.e., Channel State Information (CSI), to a BS and the BS determines one of the MCS levels based on the CSI received from the MS. The BS transmits data according to the determined MCS level.

However, according to the AMC scheme, the MS has to periodically transmit CSI to the BS, increasing signaling overhead. Moreover, the MS reports a Carrier-to-Interference and Noise Ratio (CINR) or a Received Signal Strength Indicator (RSSI) to the BS. Such a channel state report does not reflect a correct channel state.

SUMMARY OF THE INVENTION

An aspect of the present invention is to address at least the above problems and/or disadvantages and to provide at least the advantages described below. Accordingly, an aspect of the present invention is to provide a method, in which a Mobile Station (MS) determines a Modulation and Coding Scheme (MCS) level according to a measured channel state and reports the determined MCS level to a Base Station (BS) in a mobile communication system.

Another aspect of the present invention is to provide a method, in which an MS reports a channel state to a BS only in the case of an MCS level change in a mobile communication system.

According to one aspect of the present invention, there is provided a method of reporting channel state information by a Mobile Station (MS) in a mobile communication system. The method includes measuring a state of a downlink channel for the entire frequency band; determining a first Modulation and Coding Scheme (MCS) level corresponding to the measured channel state; and reporting the determined MCS level to a Base Station (BS).

According to another aspect of the present invention, there is provided a method of reporting channel state information by a Mobile Station (MS) in a mobile communication system in which the entire frequency band is divided into a plurality of bands. The method includes measuring a channel state for each of the plurality of bands during a current channel state measurement interval; selecting a predetermined number of top first bands having good channel states; if there are a predetermined number of second bands that have been selected during a previous channel state measurement interval, comparing the first bands with the second bands to determine whether the first bands and the second bands are the same as each other; if the first bands and the second bands are the same as each other, determining whether Modulation and Coding Scheme (MCS) levels of the first bands are the same as those of the second bands; and if the MCS levels of the first bands are different from those of the second bands, reporting index information of the first bands and increase/decrease information determined by subtraction of the MCS levels of the second bands from the MCS levels of the first bands to the BS.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION OF THE PREFERRED EMBODIMENTS

The matters defined in the description such as a detailed construction and elements are provided to assist in a comprehensive understanding of an exemplary embodiment of the invention. Accordingly, those of ordinary skill in the art will recognize that various changes and modifications of the embodiment described herein can be made without departing from the scope and spirit of the invention. Also, descriptions of well-known functions and constructions are omitted for clarity and conciseness.

The present invention provides a method, in which a Mobile Station (MS) measures the channel state of a downlink, determines a Modulation and Coding Scheme (MCS) according to the measured channel state, and reports the determined MCS level to a Base Station (BS) in a mobile communication system.

More specifically, the MS reports increase/decrease information indicating whether an MCS level is increased or decreased to the BS only when a current MCS level is different from a previous MCS level, thereby minimizing signaling overhead. However, if a channel state is stable, the first reported MCS level may be maintained. Thus, the MS according to the present invention does not report the channel state to the BS, which may cause the BS to recognize that a link with the MS is disconnected. To avoid this problem, the MS may report the channel state to the BS based on a preset minimum time Tmin or maximum time Tmax.

The present invention may be applied to a mobile communication system based on the Institute of Electrical and Electronics Engineers (IEEE) 802.16 standard. The IEEE 802.16 mobile communication system uses a frame including a diversity channel region and a band Adaptive Modulation and Coding (AMC) channel region.

The diversity channel region aims to attain a frequency diversity effect by uniformly distributing sub-carriers over the entire frequency band to form a sub-channel that is a unit of data transmission. The diversity channel region is used mainly for users moving at high speeds. Unlike the diversity channel region, the band AMC channel region uses frequency selectivity through physically adjacent sub-carriers to form a sub-channel. In a multi-user system, a band having a good channel characteristic such as good Signal-to-Interference and Noise Ratio (SINR) or Received Signal Strength Indicator (RSSI) is selectively allocated to different users in different channel environments, thereby maximizing a multi-user diversity gain and thus increasing total system capacity. The band AMC channel region is used mainly for users moving at relatively low speeds.

Hereinafter, a scheme in which an MS reports a channel state in each of the diversity channel and the band AMC channel will be described.

Channel State Report Scheme in Diversity Channel

Figure 1:
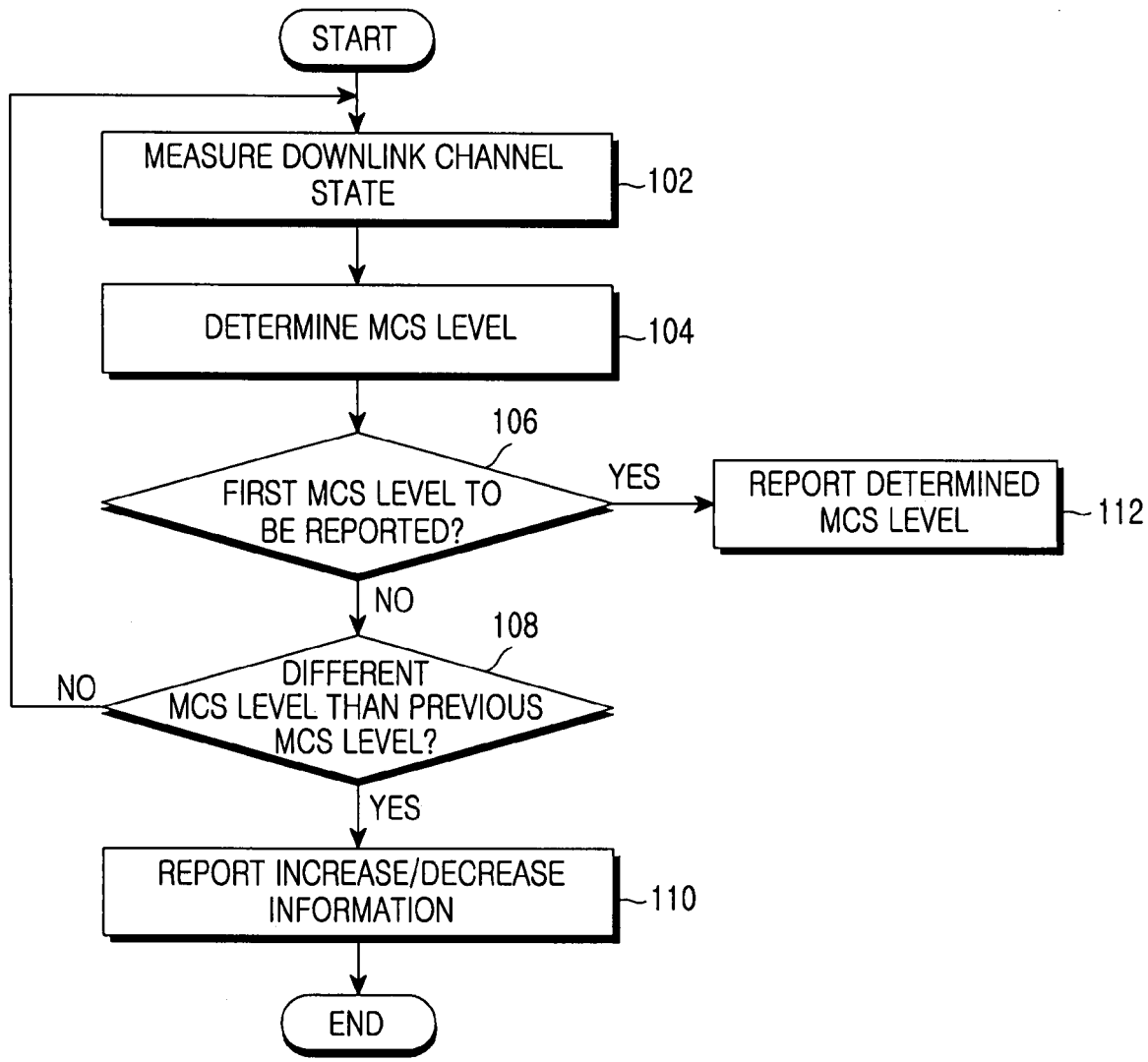
FIG. 1 is a flowchart illustrating a process in which a Mobile Station (MS) reports a channel state in a diversity channel according to the present invention.

FIG. 1 is a flowchart illustrating a process in which an MS reports a channel state in a diversity channel according to the present invention.

Referring to FIG. 1, the MS measures the state of a downlink channel from a BS for the entire frequency band in step 102. Here, the downlink channel is a diversity channel. The MS may measure the state of the diversity channel using a Carrier-to-Interference and Noise Ratio (CINR), a Signal-to-Interference and Noise Ratio (SINR), a Received Signal Strength Indicator (RSSI), and the like.

In step 104, the MS determines an initial MCS level corresponding to the measured channel state. In step 106, the MS determines whether the determined MCS level is a first MCS level to be reported to the BS. If so, the MS reports the determined MCS level to the BS in step 112. If another MCS level has been reported to the BS prior to the currently determined MCS level, the MS goes to step 108.

In step 108, the MS determines whether the previous MCS level and the current MCS level determined in step 104 are different from each other. If so, the MS goes to step 110. If the previous MCS level and the current MCS level are the same as each other, the MS returns to step 102 without reporting the current MCS level to the BS.

In step 110, the MS recognizes an MCS level change and reports information about a difference between the previous MCS level and the current MCS level, i.e., increase/decrease information indicating whether an MCS level is increased or decreased to the BS. For example, if the previous MCS level is 3 and the current MCS level is 2, the MS reports increase/decrease information indicating an MCS level decrease to the BS. The increase/decrease information may be expressed with 1 bit and be reported to the BS through a channel state report message used in a Medium Access Control (MAC) layer or a dedicated Channel State Indicator (CSI) report channel used in a physical layer. One bit for the increase/decrease information is set to '1' for the MCS level increase and is set to '0' for the MCS level decrease. Such a channel state report using the 1-bit increase/decrease information is based on a precondition that the downlink channel state does not change so sharply that an MCS level change exceeding two levels cannot occur.

Figure 2:
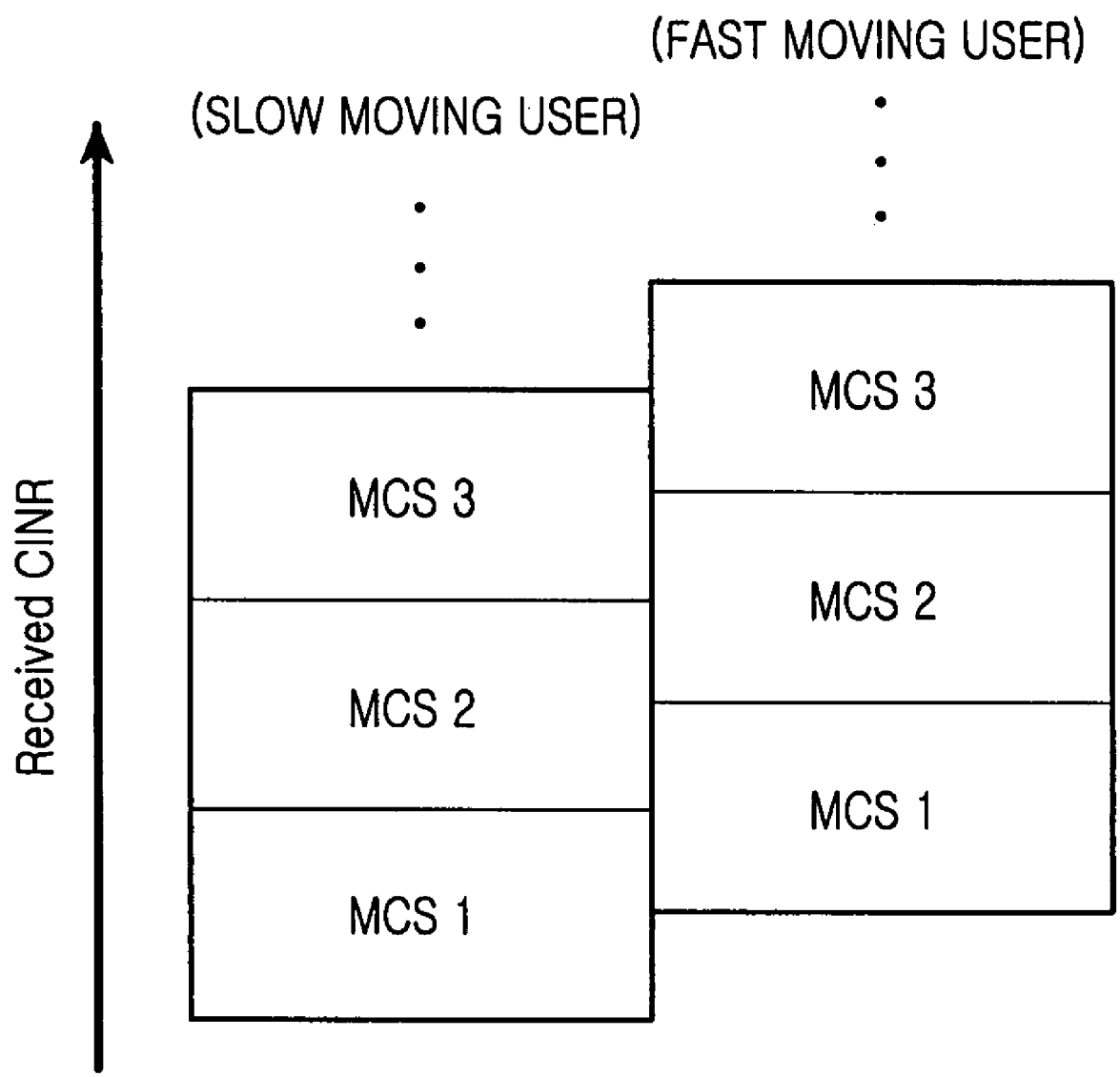
FIG. 2 is a view for explaining a process in which a high-speed MS determines a Modulation and Coding Scheme (MCS) level according to the present invention.

However, there may be an MS having a sharply changing channel state such as an MS moving at a high speed. Therefore, as illustrated in FIG. 2, an MCS level determination threshold for a fast moving MS is set higher than that for a slow moving MS, thereby reducing a packet error rate.

Figure 3:
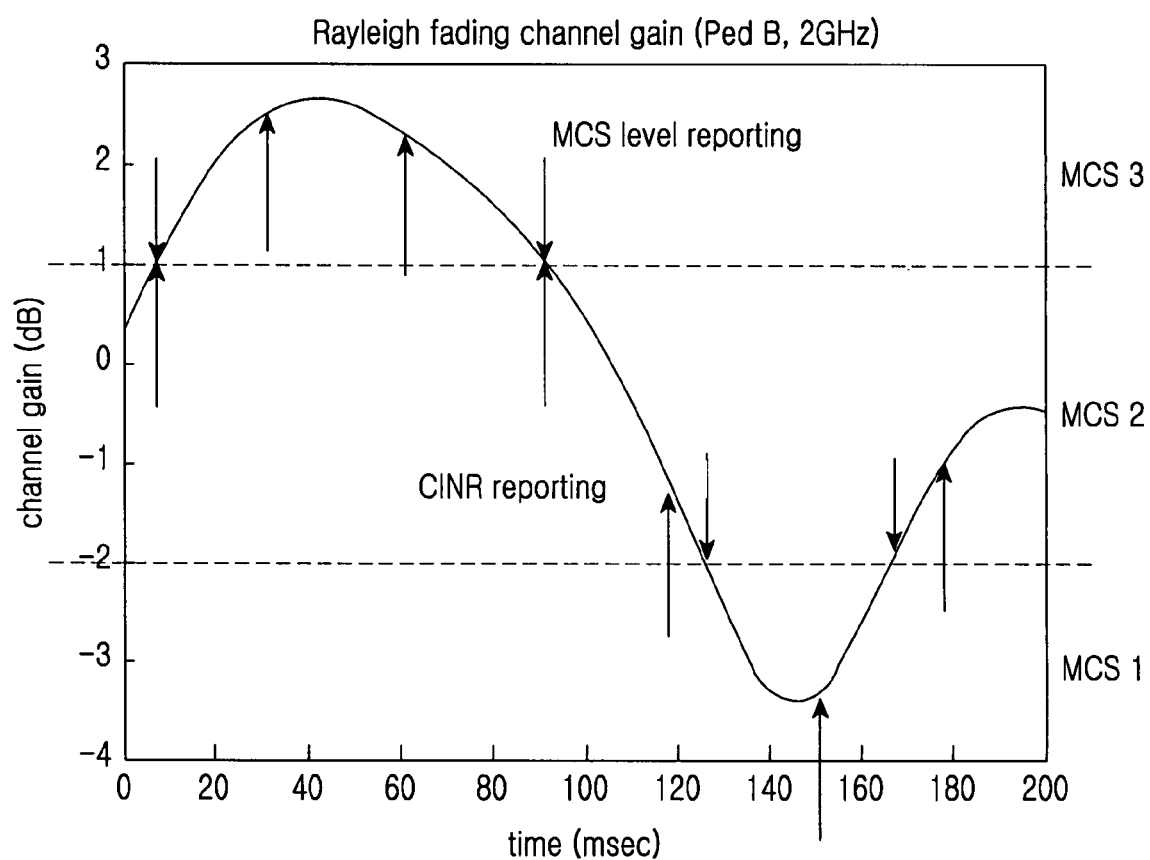
FIG. 3 is a graph for comparing the number of reports of a diversity channel state made by an MS according to the present invention with the number of periodic reports of a channel state made by an MS according to the prior art.

FIG. 3 is a graph for comparing the number of reports of a diversity channel state made by an MS according to the present invention with the number of periodic reports of a channel state made by an MS according to the prior art.

Referring to FIG. 3, the number of reports made by an MS that measures a CINR and reports a channel state periodically, e.g., at intervals of 30 msec, is 7 for 200 msec according to the prior art, whereas the number of reports made by an MS is reduced to 4 because the MS reports an MCS level only in the event of an MCS level change according to the present invention. Moreover, a large amount of resources are consumed by an MS's report of a CINR to a BS according to the prior art. In contrast, according to the present invention, an MS initially reports an MCS level and then reports only 1-bit increase/decrease information indicating whether an MCS level is increased or decreased to a BS, thereby minimizing resource consumption.

Channel State Report Scheme in Band AMC Channel

Prior to explanation of the channel state report scheme in a band AMC channel, in a frame structure, a full sub-carrier band is divided into a plurality of bands, each of which is composed of a plurality of bins or tiles. Each of the bins or tiles includes a plurality of sub-carriers. The band AMC channel includes a plurality of bands, each of which is composed of 6 bins.

Figure 4:
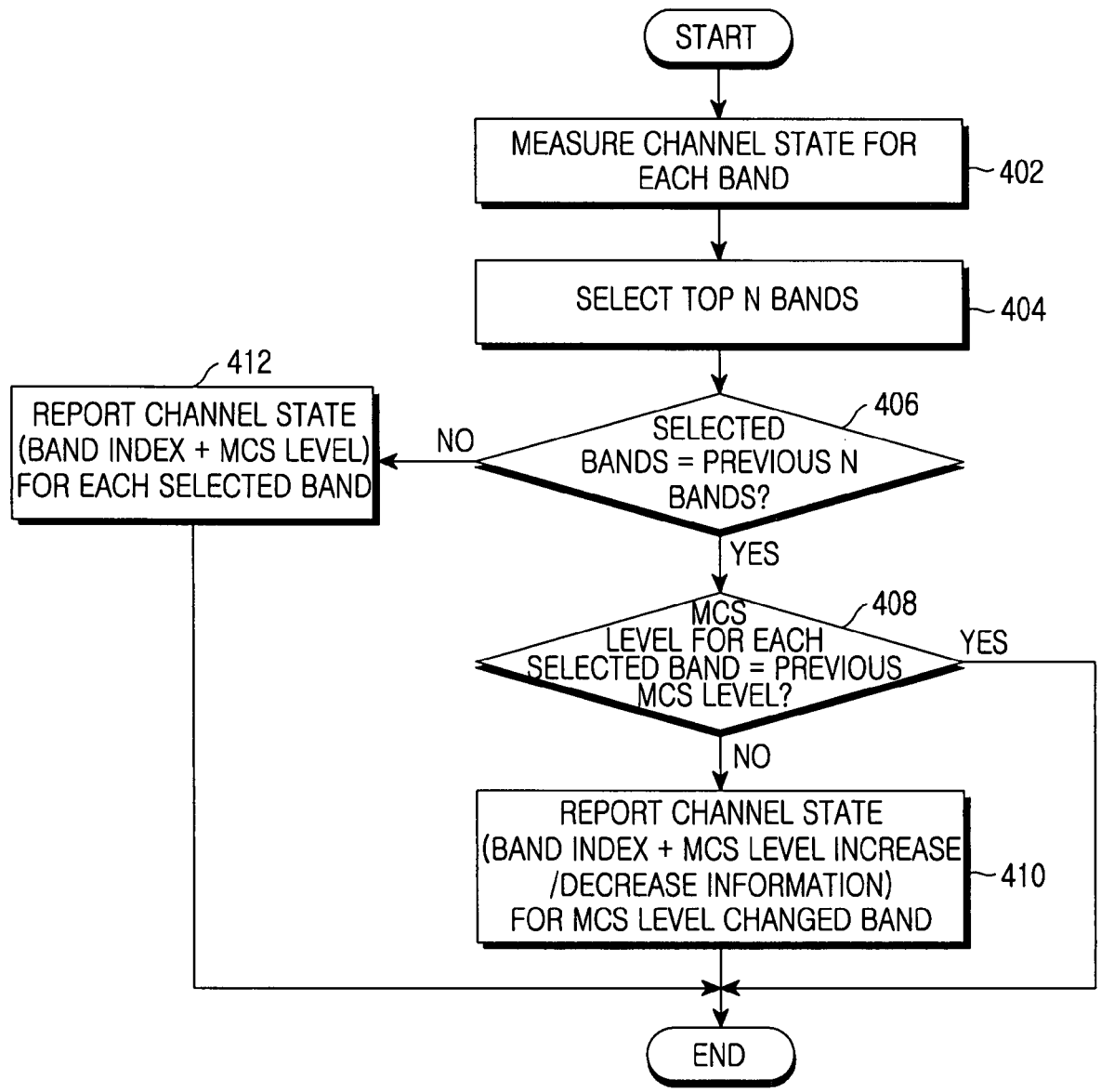
FIG. 4 is a flowchart illustrating a process in which an MS reports a channel state in a band Adaptive Modulation and Coding (AMC) channel according to the present invention.

FIG. 4 is a flowchart illustrating a process in which an MS reports a channel state in a band AMC channel according to the present invention.

Referring to FIG. 4, the MS measures a channel state for each band in step 402. In step 404, the MS selects top N bands having good channel states. In step 406, the MS compares previously selected N bands with the current N bands selected in step 404 to determine whether the previous N bands and the current N bands are the same as each other. If so, the MS goes to step 408. Otherwise, the MS goes to step 412 to report the channel state for each selected band. If there is no previously selected band in step 406, the MS goes to step 412.

In step 408, the MS determines whether each of the current N bands has the same MCS level as a previous MCS level. If at least one of the N bands has a different MCS level than a previous MCS level, the MS goes to step 410. Otherwise, the MS does not report a channel state to the BS. In step 410, the MS reports a channel state for a band having a changed MCS level to the BS. Here, the MS makes a report by transmitting index information of the band having the changed MCS level and increase/decrease information indicating an MCS level is increased or decreased to the BS. The index information uses a fixed index value for each band.

In step 412, the MS reports a channel state for each of the selected N bands to the BS. To this end, the MS reports index information of the selected N bands and an MCS level for each of the bands to the BS.

As mentioned above, once the MS transmits band index+MCS level information, or transmits band index+MCS level increase/decrease information to the BS, the BS selects a band to be allocated to the MS based on the received channel state information and applies an MCS level determined by the MS to the selected band. However, if the BS fails to receive channel state information during a frame interval, it applies a band and an MCS level that have been used for a previous frame.

Figure 5:
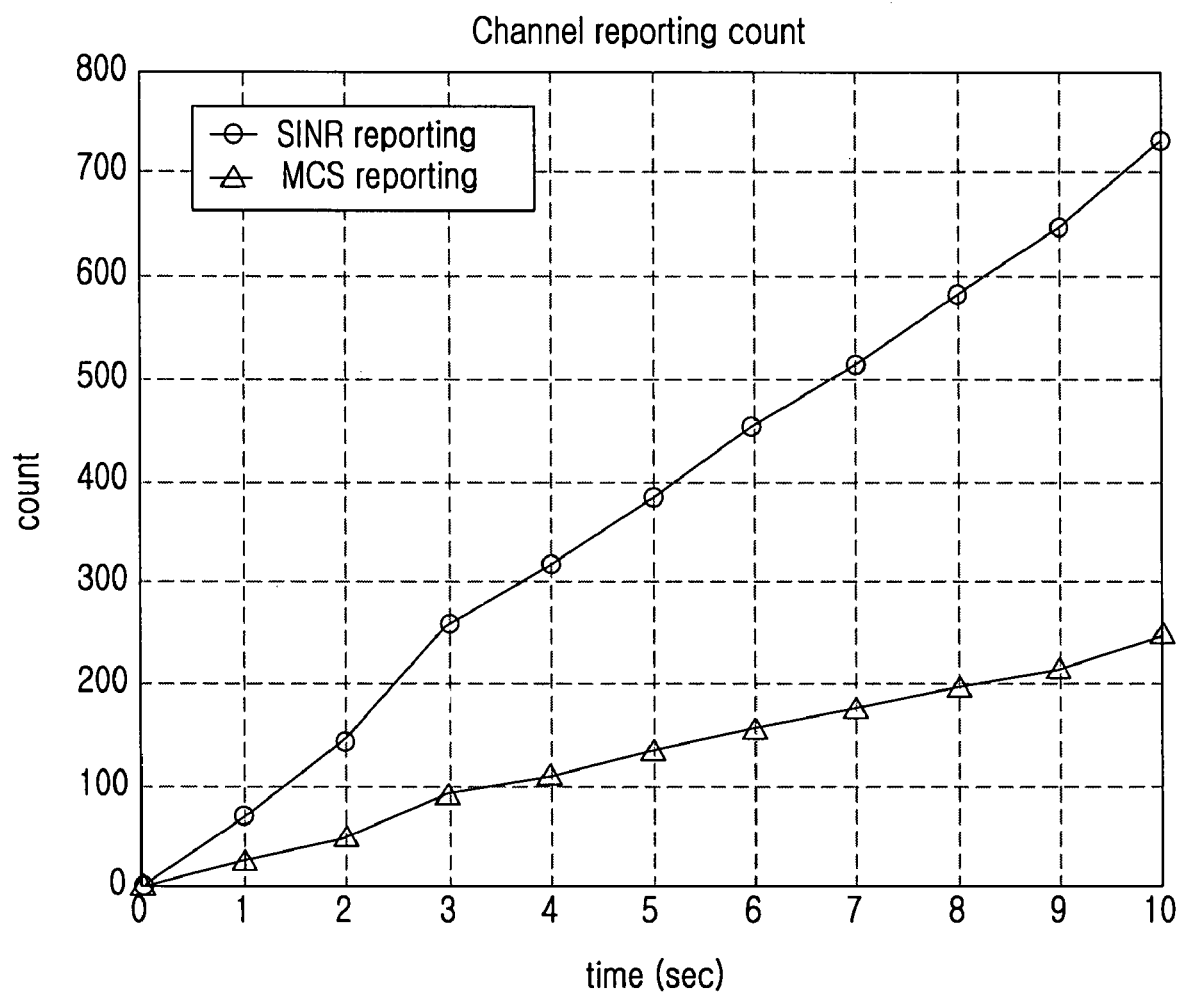
FIG. 5 is a graph showing simulation results for comparing the performance of a channel state report scheme according to the present invention with the performance of a channel state report scheme according to the prior art.

FIG. 5 is a graph showing simulation results for comparing the performance of a channel state report scheme according to the present invention with the performance of a channel state report scheme according to the prior art.

According to the prior art, an MS measures a channel state for each band and reports a channel state each time an SINR changes. In other words, a channel state is reported using an SINR according to the present invention. On the other hand, according to the present invention, an MS reports only band index+MCS level information, or band index+MCS level increase/decrease information, when a selected band or an MCS level changes, thereby reducing signaling overhead.

An MS and a BS according to the present invention may use a timer for adjusting a channel state information report interval. The MS and the BS preset a Tmin or Tmax timer. Here, Tmin or Tmax may be preset by negotiation with the BS at the time of the MS's network entry. For example, Tmin may be set high when the MS moves at a speed lower than a reference speed and may be set low when the MS moves at a speed higher than the reference speed. Tmax indicates the maximum time during which the BS can wait for a channel state report from the MS. For example, if the BS does not receive a channel state report from the MS until the timer reaches Tmax, the BS may request the MS of a channel state report. The MS and the BS may also operate the Tmin or Tmax timer commonly with or independently of each other. The MS has to report a channel state to the BS regardless of an MCS level change if the timer reaches Tmin.

As described above, according to the present invention, when an MS transmits channel state information to a BS in a diversity channel and a band AMC channel, the number of transmissions of channel state information and the amount of channel state information are reduced, thereby minimizing signaling overhead. In particular, the MS determines an MCS level corresponding to a downlink channel state and transmits MCS level increase/decrease information only in the event of an MCS level change, thereby reducing the amount of channel state information.

While the invention has been shown and described with reference to an exemplary embodiment thereof, it will be understood by those skilled in the art that various changes in form and details may be made therein without departing from the spirit and scope of the invention.

What is claimed is:

1. A method of reporting channel state information by a Mobile Station (MS) in a mobile communication system, the method comprising:
   measuring a state of a downlink channel for the entire frequency band;
   determining a first Modulation and Coding Scheme (MCS) level corresponding to the measured channel state;
   reporting the first MCS level to a Base Station (BS);
   after reporting the first MCS level to the BS, determining a second MCS level for a downlink channel during a next channel state measurement interval;
   comparing the second MCS level with the first MCS level; and
   if the first MCS level and the second MCS level are different from each other, reporting increase/decrease information determined by subtraction of the second MCS level from the first MCS level to the BS.

2. The method of claim 1, wherein if the first MCS level and the second MCS level are the same as each other, the second MCS level is not reported to the BS.

3. The method of claim 1, wherein the downlink channel is a diversity channel.

4. The method of claim 1, wherein the state of the downlink channel is measured using a Signal-to-Interference and Noise Ratio (SINR).

5. The method of claim 1, wherein when the entire frequency band is divided into a plurality of bands, the method further comprising:
   measuring a channel state for each of the plurality of bands during a current channel state measurement interval;
   selecting a predetermined number of top first bands having good channel states;
   if there are a predetermined number of second bands that have been selected during a previous channel state measurement interval, comparing the first bands with the second bands to determine whether the first bands and the second bands are the same as each other;
   if the first bands and the second bands are the same as each other, determining whether Modulation and Coding Scheme (MCS) levels of the first bands are the same as those of the second bands; and
   if the MCS levels of the first bands are different from those of the second bands, reporting index information of the first bands and increase/decrease information determined by subtraction of the MCS levels of the second bands from the MCS levels of the first bands to the BS.

6. The method of claim 5, wherein the MCS levels of the first bands and the second bands are determined by the MS according to the measured channel states.

7. The method of claim 5, further comprising, if there is no second band that has been selected during the previous channel state measurement interval, reporting the index information of the first bands and the MCS levels of the first bands to the BS.

8. The method of claim 5, further comprising, if there are a predetermined number of second bands that have been selected during the previous channel state measurement interval and the first bands and the second bands are not the same as each other, reporting the index information of the first bands and the MCS levels of the second first bands to the BS.

* * * * *